UNITED STATES PATENT OFFICE.

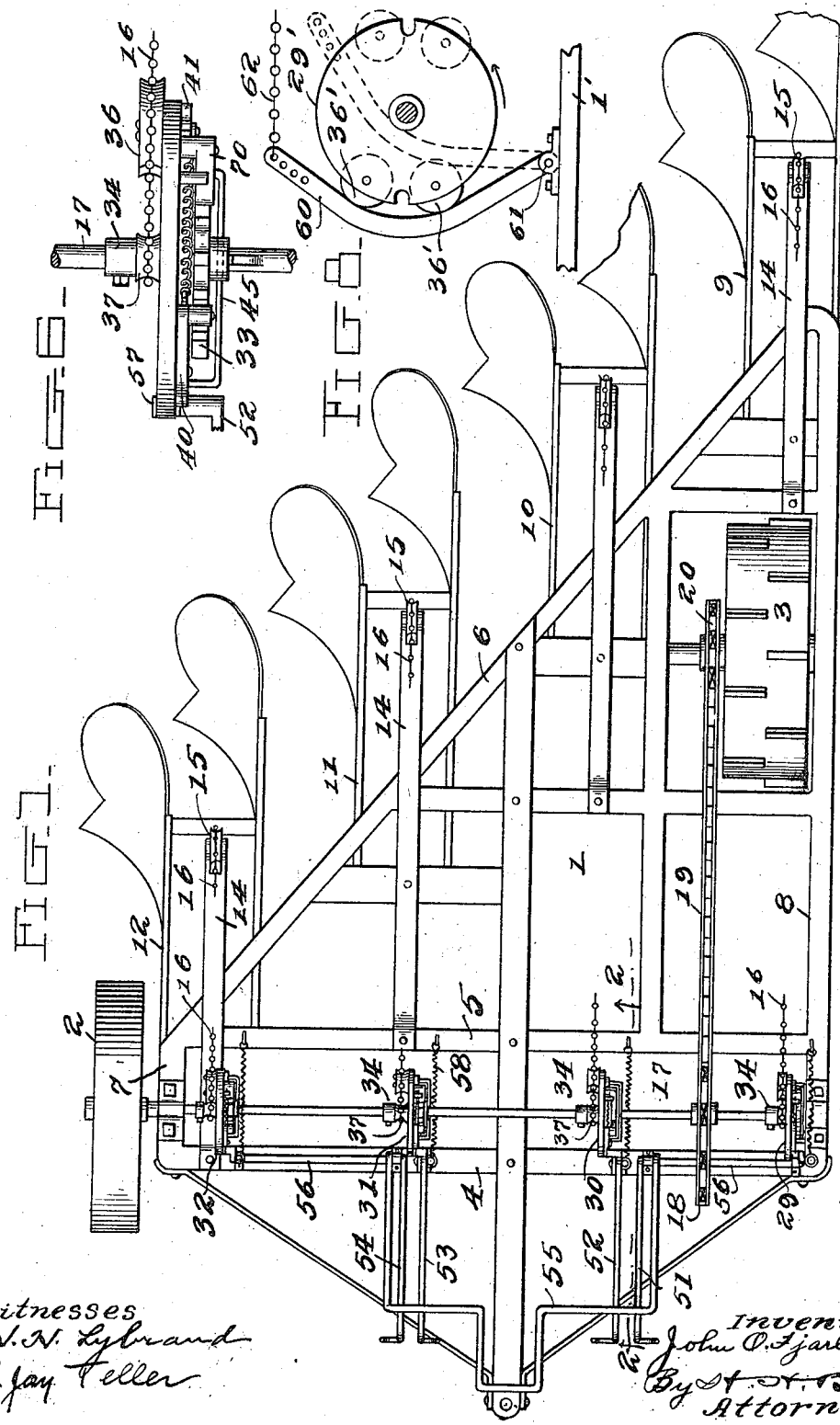

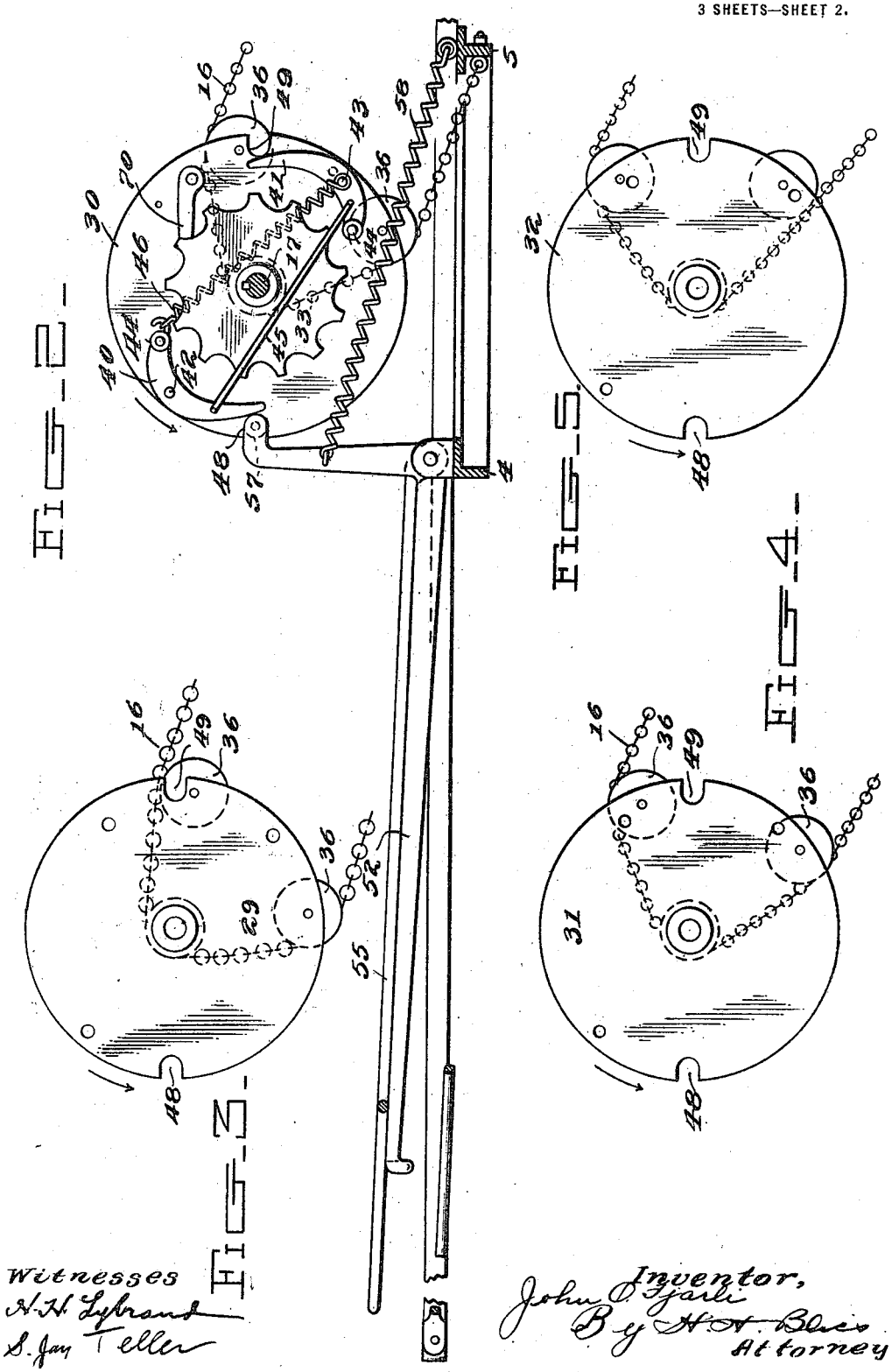

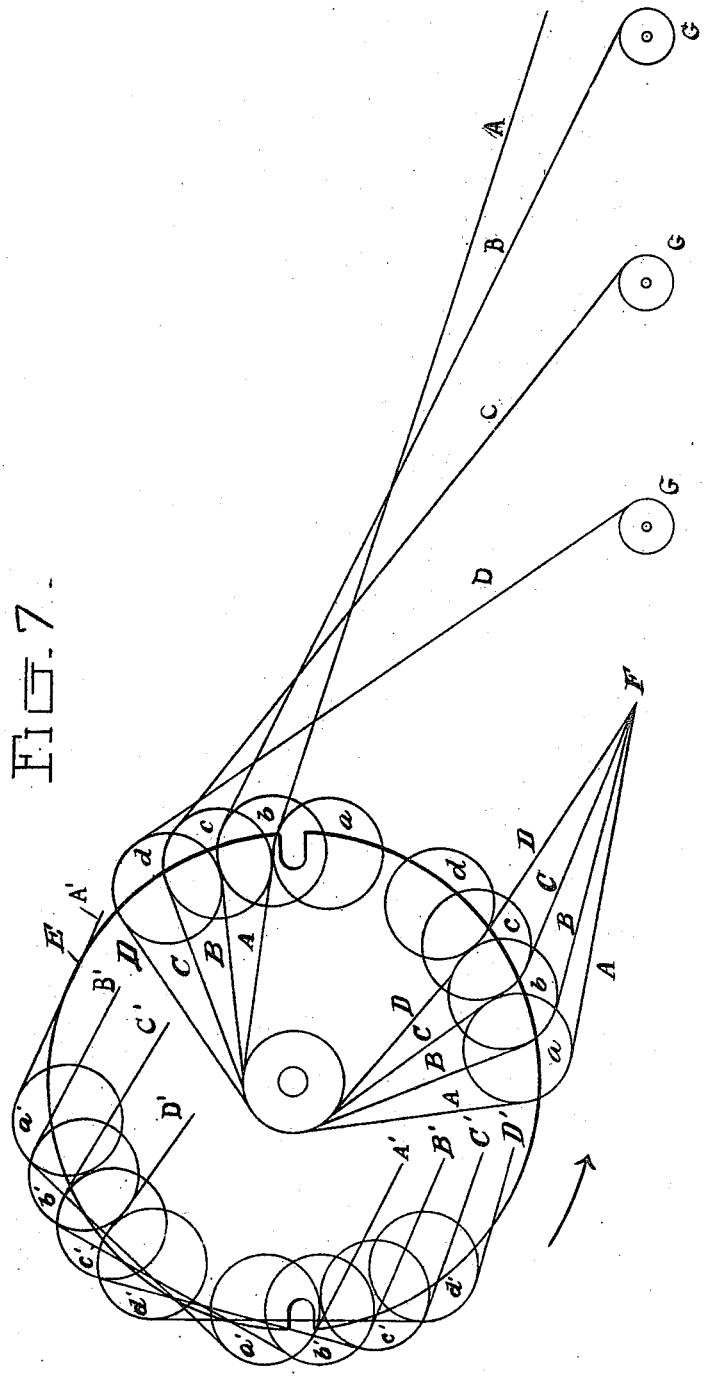
J. O. FJARLI.
GANG PLOW.
APPLICATION FILED DEC. 11, 1914.
1,237,626.
Patented Aug. 21, 1917.
3 SHEETS—SHEET 3.

JOHN O. FJARLI, OF BERWICK, NORTH DAKOTA.

GANG-PLOW.

1,237,626.　　　　　Specification of Letters Patent.　　Patented Aug. 21, 1917.

Original application filed December 20, 1909, Serial No. 534,227. Divided and this application filed December 11, 1914. Serial No. 876,671.

*To all whom it may concern:*

Be it known that I, JOHN O. FJARLI, a citizen of the United States, residing at Berwick, in the county of McHenry and State of North Dakota, have invented certain new and useful Improvements in Gang-Plows, of which the following is a specification, reference being had therein to the accompanying drawings.

This invention relates to certain new and useful improvements in gang plows, such as are drawn by traction or other power vehicles, or are operated by self contained power.

One object of the invention is to provide an improved mechanism for effecting the raising and lowering of the plows of a series in successive timed relationship so that the furrows will all begin or end at points along the same transverse line.

Another object is to provide means whereby all of the plows can be raised or lowered together by moving one lever or whereby one or more of the plows can be raised or lowered independently of the others under manual control.

The above and other characteristic features of the invention are fully illustrated in the accompanying drawings forming a part of this specification and wherein like characters of reference designate corresponding parts throughout several views, in which:

Figure 1 is a top plan view;

Fig. 2 is a vertical sectional view taken on line 2—2 of Fig. 1;

Figs. 3, 4 and 5 are views in side elevation of the locking disks detached illustrating the different relative location of the wheels thereon for the plow frame raising and lowering chains;

Fig. 6 is a top plan view of one of the locking disks with its complement ratchet wheel;

Fig. 7 is a diagram illustrating the theory of operation of the plow raising devices.

Fig. 8 is a view similar to Fig. 2 but showing a modified form of construction.

Reference number 1 designates the vehicle frame, 2 one of the traction wheels therefor, and 3 the other traction wheel from which the plow raising and lowering mechanism is operated. The vehicle frame essentially comprises parallel front and intermediate bars 4 and 5 and diagonal rear bar 6, and side bars 7 and 8.

The plows are mounted in duplicate on plow frames 9, 10, 11 and 12, said frames being suitably connected with the vehicle frame for raising and lowering. The plows and frames therefor are arranged in diagonal series parallel with the said rear bar 6 of the vehicle frame. There are provided suitable devices for lifting the plows from the ground. As shown, there is secured to the vehicle frame and projecting rearwardly therefrom and above each of said plow frames a beam 14 provided in its rear end with a pulley 15. Attached to the plow frames are chains 16, the chain of each plow-frame leading upwardly over the pulley 15 of its respective beams 14. It will be understood that as concerns the exact form of the lifting devices immediately associated with the plows there can be considerable variation within the scope of the invention. The chains 16 extend forwardly over and around the main shaft 17 and then rearwardly and downwardly to the intermediate vehicle frame bar 5 to which the free ends of said chains are attached.

The said main shaft 17 has its free ends journaled in the vehicle side bars 7 and 8 and extends across the vehicle frame between and parallel with the said bars 4 and 5. Keyed to said main shaft 17 is a sprocket wheel 18 operably connected by means of a sprocket chain 19 with a sprocket wheel 20, which latter is operated by said traction wheel 3. While the main shaft is illustrated as being operated from the vehicle traction wheel, it may be operated by an independent motor or engine carried on the vehicle frame or from any other rotatable element to be found in plows of this type.

Loose upon the main shaft are locking disks 29, 30, 31 and 32, which constitute the initial elements of the lifting mechanisms connected with the respective plow units. The disk 29 is arranged or located at a point on the shaft in line with the beam 14 of the plow frame 9, and the remaining locking disks 30, 31 and 32 are similarly located relatively to their plow frames 10, 11 and 12. Keyed to the main shaft 17 are ratchet wheels 33, one being provided for each locking disk, on one side thereof, and each locking disk is held between its ratchet wheel 33 and a collar 34, the latter also fixed to the main shaft 17.

Upon one side of each locking disk are journaled two lifting pulleys 36, which, upon rotation of the locking disks, as indicated by the arrows in Figs. 2, 3, 4 and 5, engage the plow-frame raising and lowering chains 16, thereby raising the plow frames on one-half revolution of the locking disks and lowering them upon the other half revolution of said disks. While the plow frames are in their lowered position, the locking disks, pulleys 36, and chains 16 will be in the positions illustrated in Figs. 2, 3, 4 and 5, in which views the chains 16 are shown apparently in contact with the shaft, but by referring to Fig. 6, it will be noted that the locking disks are each equipped with a hub portion 37 around which the said chains 16 pass to prevent abrasion of the main shaft 17 and displacement of the chains.

The mechanism for rotating the locking disks comprises two pawls 40 and 41, a pair being pivotally mounted by pins 42 and 43, upon each of said locking disks. One end of each pawl, as illustrated in Fig. 2, is provided with a collar 44 adapted to enter one of the notches in the ratchet wheels 33. The roller end of one pawl of each disk is connected by means of a rod or link 45 with the opposite end of the other pawl of the pair so that the roller ends of both associated pawls will act upon the ratchet wheel 33 in the same manner. The roller end of the pawls are normally drawn into engagement with the ratchet wheel by means of a spring 46 attached to the roller end of pawl 40 and to the pivot pin 43 of the complement pawl 41. The locking disks are provided with peripheral notches 48 and 49 at diametrically opposite points, and the tail ends of the pawls 40 and 41 are so related to said notches 48 and 49 respectively that when the roller ends of the pawls are engaged with the ratchet wheel 33, said tail ends will move outwardly to overlap said notches as will be apparent.

Pivotally mounted upon the forward end of the vehicle frame are foot levers 51, 52, 53 and 54, operable independently. These levers may be operated simultaneously by means of a main foot lever 55 pivoted upon the shaft portions 56 of the foot levers 51 and 54 and engaging all of said foot levers. Each of the foot levers 51, 52, 53 and 54 is in the form of a bell-crank, the foot depressing portion being substantially in a horizontal plane and the locking portion extending upwardly to a point in horizontal alinement with the axis of the main shaft 17 where it is bent at right angles and provided with a roller 57, adapted to enter one or the other of the locking-disk notches 48—49, due to the releasing of pressure by the foot and the action of the spring 58 attached to each foot lever and to the bar 5 of the vehicle frame.

Owing to the diagonal arrangement of the plow frames, the pulleys 36 are arranged at different relative points on the locking disks, as illustrated in Figs. 2, 3, 4, 5, and diagrammatically in Fig. 8, in order that the plows will enter and leave the soil at different times successively so that the furrows will begin and end at the same points.

The operation is as follows: Upon the plow vehicle being drawn or propelled over the soil, a continuous rotary motion is imparted by sprocket chain 19 to the main shaft 17, and to the ratchet wheels 33 keyed thereto. The locking disks 29, 30, 31 and 32 being loose upon the main shaft 17 are held against rotation by means of the roller ends of the foot levers 51, 52, 53 and 54 engaging in one or the other of the locking disk notches, due to the action of springs 58 normally drawing said roller ends 57 of foot levers toward said disks. In Figs. 2, 3, 4 and 5 the locking disks are illustrated in the positions assumed when the plows are lowered, and by referring to Fig. 2 it will be seen that the roller ends 57 of the foot levers are engaged in the notches 48 of the locking disks. The tail end of the pawl 40 is pressed inwardly by the roller end of the foot lever thereby holding the roller end 44 of the pawl 40 out of engagement with the ratchet wheel 33 against the action of the spring 46. Pawl 41, it will be understood, acts the same as pawl 40 due to the connecting link 45. In these positions, the various elements remain during the plowing operation. When it is desired to discontinue the plowing, the operator depresses the foot levers by pressure upon the master lever 57 thereby withdrawing the roller ends 57 from the notches 48 and permitting the spring 46 to draw the roller ends 44 of the pawls 40—41 into locking engagement with the ratchet wheels 33 thereby causing the disks 29, 30, 31 and 32 to rotate with the main shaft 17 in the direction indicated by the arrows. During the half rotation of the locking disks, the pulleys 36 thereof will successively engage the chains 16, drawing upon the same to successively raise the plows from engagement with the soil. Pressure is released upon the foot levers as soon as the disks begin to rotate and the rollers 57 of said foot levers remain in rolling contact with the periphery of the said locking disks until notches 49 present themselves at which time springs 58 will cause said roller ends 57 to fall into said notches 49, depressing the tail ends of the pawl 41 and raising the roller ends 44 thereof from engagement with the ratchet wheels 33; pawl 40 being similarly affected due to link 45. Thus the locking disks will once more be held stationary until it is again desired to lower the plows into the soil. During the lowering operation the weight of the plows will cause the locking disks to run away from the ratchet wheel and turn too fast, and to prevent this a pawl 70 is provided on each of the locking disks for engagement with the adjacent ratchet wheel.

The modification illustrated in Fig. 8 contemplates the incorporation of lifting levers 60 pivoted at 61 to the vehicle frame 1' for operating the plow raising and lowering chains 62 which are attached to the upper ends of the levers 60. The locking disks 29' are provided with tripping rollers 36' which engage and operate said levers 60, said lever 60 and rollers 36' assuming the dotted line positions when the plows are lowered.

This application constitutes a division of my copending application Serial No. 840,125, filed May 21, 1914, as a renewal of application Serial No. 534,227, filed December 20, 1909. In the aforesaid application there are presented claims relating to a single plowing unit and the devices for raising and lowering it. In this present application, therefore, I do not claim specifically the individual plowing units and the raising and lowering devices therefor, but merely claim a series of plowing units and a series of raising and lowering devices together with the means whereby the raising and lowering devices of the series are actuated and controlled.

What I claim is:

1. The combination of the frame, the plow pivoted thereto, the power driven continuously rotating shaft on the frame, the plurality of disks loosely journaled on the shaft, means for coupling the disks with the shaft, plow lifting devices actuated by the disks and arranged in relation to the shaft to lift the plows successively in fixed predetermined time relations for their upward movements irrespective of the times of commencing the movements of the disks, means for locking the disks against downward movement of the plows, means for unlocking any one of the disks independently of the others, and means for unlocking all the disks simultaneously.

2. The combination of the frame, the plows carried thereby, a power driven continuously going shaft on the vehicle, a series of devices for transmitting power to lift the plows, a series of plow raising and lowering members journaled on the shaft and respectively connected to said transmitting devices and arranged to act successively thereon at the ends of predetermined time intervals, a series of independent locks for said members, means for opening at will any of said locks, means for opening, at option, each of said locks independently of all the others, or opening them all simultaneously.

3. The combination in gang plow of a main draft frame, a plurality of trailing plow units connected to the frame in a diagonal series, a continuously operating ground wheel actuated power shaft, a plurality of normally idle lifting mechanisms for the plow units respectively each comprising a disk mounted loosely relatively to the shaft and a power transmitter connecting the disk to a plow unit, means for connecting the lifting mechanisms directly to the said power mechanism for operation in timed relationship to each other to lift the plow units successively, means for locking the lifting mechanisms when the plows are elevated, and means for unlocking each of said mechanisms independently of the others.

4. The combination in a gang plow of a main draft frame, a plurality of trailing plow units connected to the frame in a diagonal series, continuously operating ground wheel actuated power mechanism, a plurality of normally idle lifting mechanisms for the plow units respectively, means for connecting each of the lifting mechanisms directly to the said power mechanism either independently of each other or for operation in timed relationship to each other to lift the plow units successively, and means for disconnecting each of the respective lifting mechanisms independently of the others from the power mechanisms after the lifting of the corresponding units.

5. The combination in a gang plow of a main draft frame, a plurality of trailing plow units connected to the frame in a diagonal series, a continuously operating power device on the frame, a plurality of normally idle lifting mechanisms for the plow units respectively, means for connecting the lifting mechanisms directly to the said power device either independently of each other or for operation in timed relationship to each other to lift the plow units successively and means for disconnecting each of the lifting mechanisms independently of the others from the power device.

6. The combination in a gang plow of a main draft frame, a plurality of trailing plow units connected to the frame in a diagonal series, a continuously operating power device on the frame, a plurality of normally idle lifting mechanisms for the plow units respectively, means for connecting the lifting mechanisms directly to the said power device either independently of each other or for operation in timed relationship to each other to lift the plow units successively, and means for disconnecting each of the respective lifting mechanisms independently of all of the others from the power device after the lifting of the corresponding units.

7. The combination in a gang plow of a main draft frame, a plurality of trailing plow units connected to the frame in a diagonal series, a unitary continuously rotating ground wheel driven power shaft on the frame, a plurality of normally idle lifting mechanisms for the plow units respectively and each comprising an initial element rotatably mounted on the shaft, and means for connecting each of the initial elements of the lifting mechanisms directly to the said power shaft either independently of the others or to cause the mechanisms to operate in timed relationship to each other to lift the plow units successively.

8. The combination in a gang plow of a main draft frame, a plurality of trailing plow units connected to the frame in a diagonal series, a unitary continuously operating ground wheel driven power shaft on the frame, a plurality of normally idle lifting mechanisms for the plow units respectively each comprising an initial element rotatably mounted on the shaft, means for connecting the initial elements of the lifting mechanisms directly to the said power shaft to cause the mechanisms to operate in timed relationship to each other to lift the plow units successively, and means for disconnecting each of the respective initial elements independently of the others from the power shaft after the lifting of the corresponding units.

9. The combination in a gang plow of a main draft frame, a plurality of trailing plow units connected to the frame in a diagonal series, a continuously operating power device on the frame, a plurality of normally idle power transmitters, means for connecting the power transmitters directly to the said power device either independently of each other or simultaneously, lifting mechanisms respectively connecting the said power transmitters with the corresponding plow units and constructed to be operated by the said transmitters successively to lift the plow units successively in timed relationship to each other, means for locking the plows in elevated positions, and means to release any of the said locking devices independently of the others.

10. The combination in a gang plow of a main draft frame, a plurality of trailing plow units connected to the frame in a diagonal series, a continuously operating power device on the frame, a plurality of normally idle lifting mechanisms for the plow units respectively, manually controllable devices for optionally connecting any one of the lifting mechanisms independently of the other directly to the said power device to lift the corresponding plow unit, means for operating all of the said manually controllable devices to cause the lifting of all of the plow units in timed successive relationship, locking devices for holding the plows in their elevated positions, and means for releasing any of the plows independently of the others for lowering them.

In testimony whereof, I affix my signature in the presence of two witnesses.

JOHN O. FJARLI.

Witnesses:
C. P. BLASING,
WM. FIMM.

Copies of this patent may be obtained for five cents each, by addressing the "Commissioner of Patents, Washington, D. C."